R. W. EASTON & E. T. WINKLER.
SWING.
APPLICATION FILED SEPT. 24, 1908.
951,061.
Patented Mar. 1, 1910.
9 SHEETS—SHEET 1.
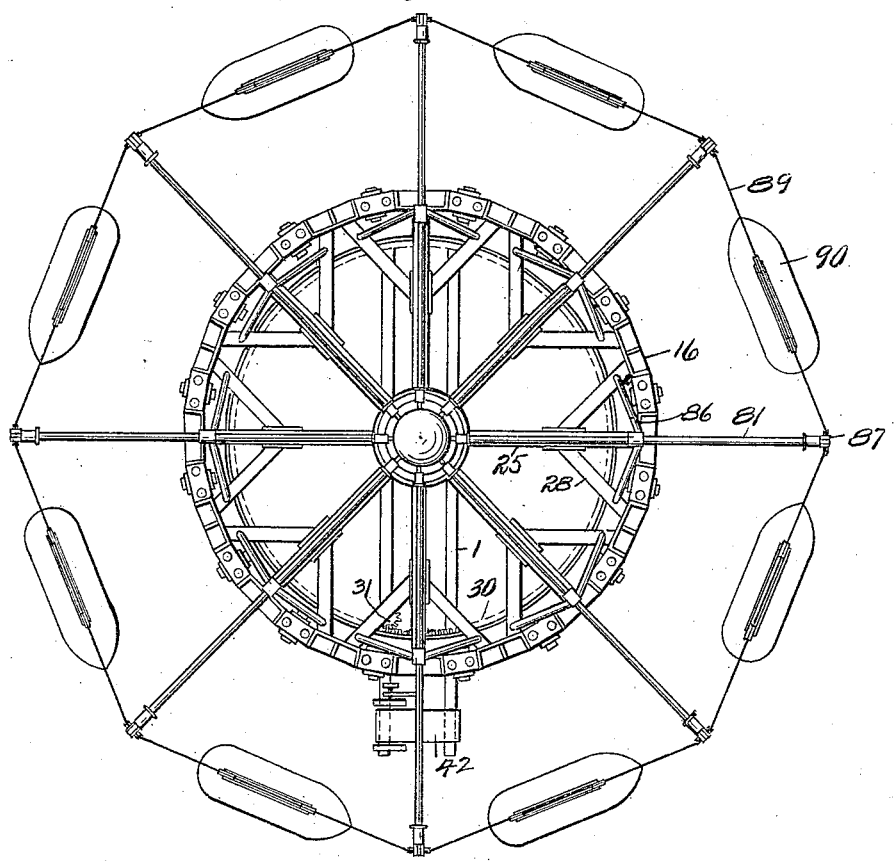
Fig. I.

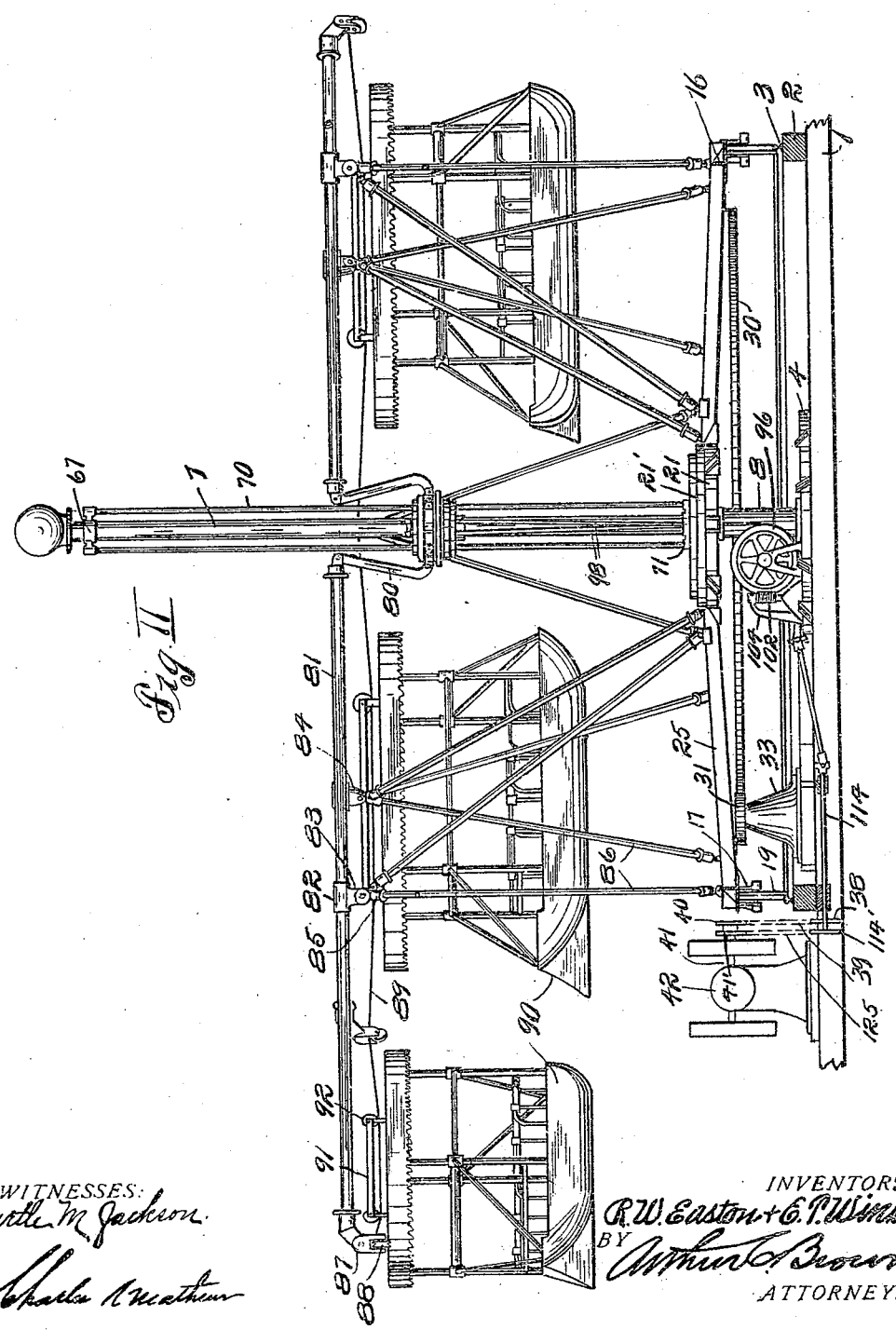

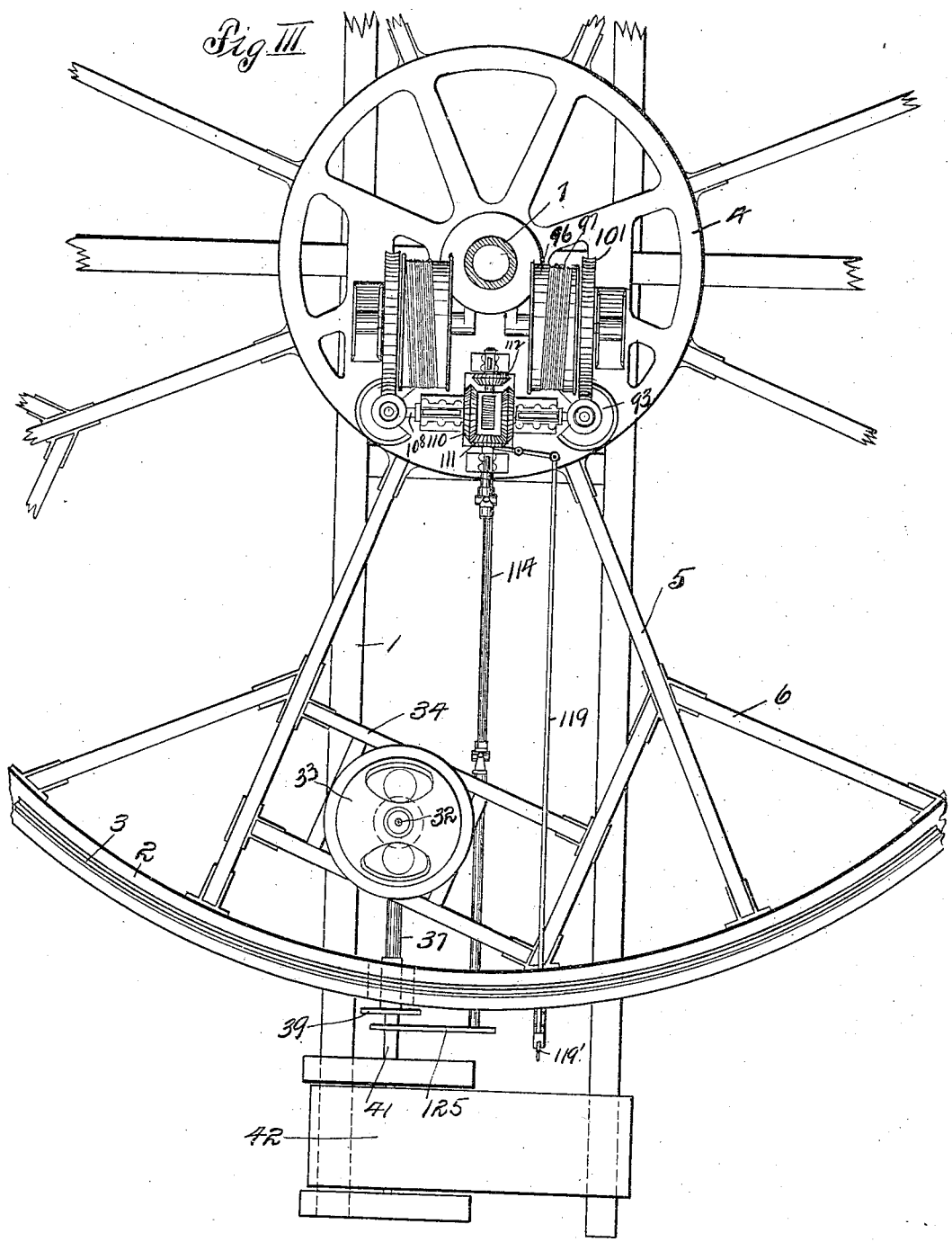

R. W. EASTON & E. T. WINKLER.
SWING.
APPLICATION FILED SEPT. 24, 1908.
951,061.
Patented Mar. 1, 1910.
9 SHEETS—SHEET 4.
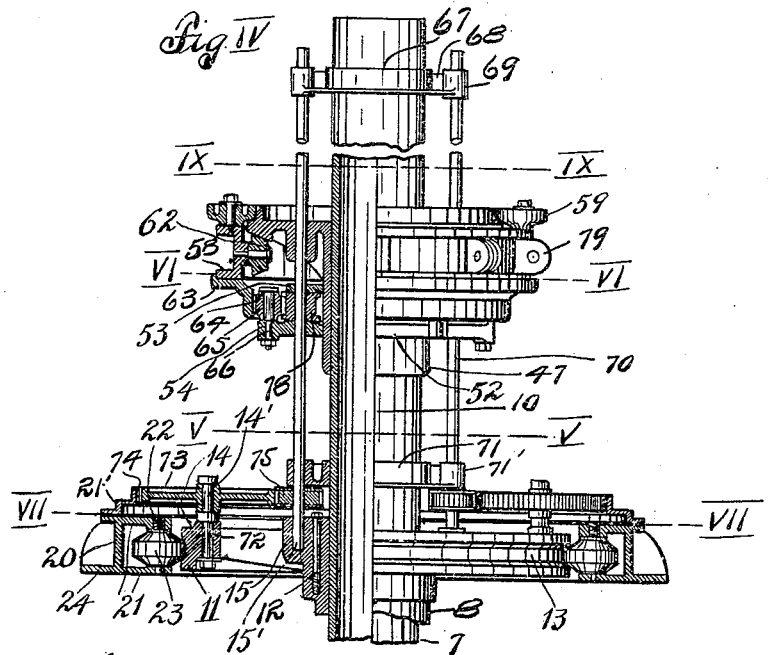
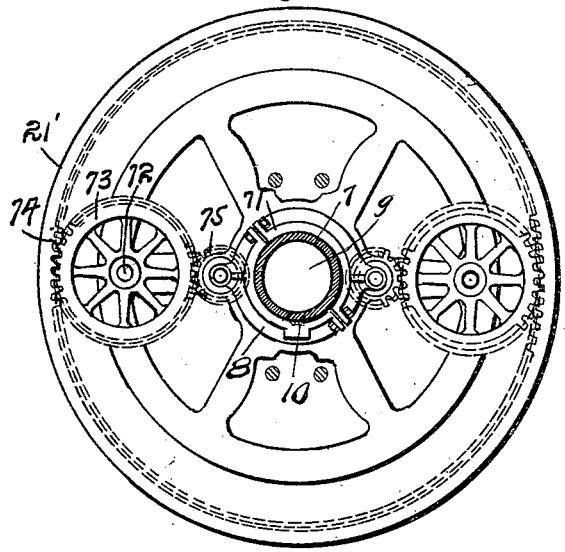
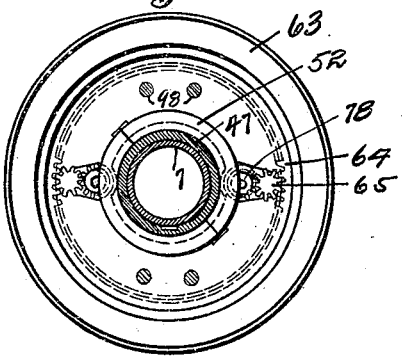
WITNESSES:
Myrtle M. Jackson
Charles R. Mathews
INVENTORS
R. W. Easton + E. T. Winkler
BY
Arthur C. Brown
ATTORNEY.

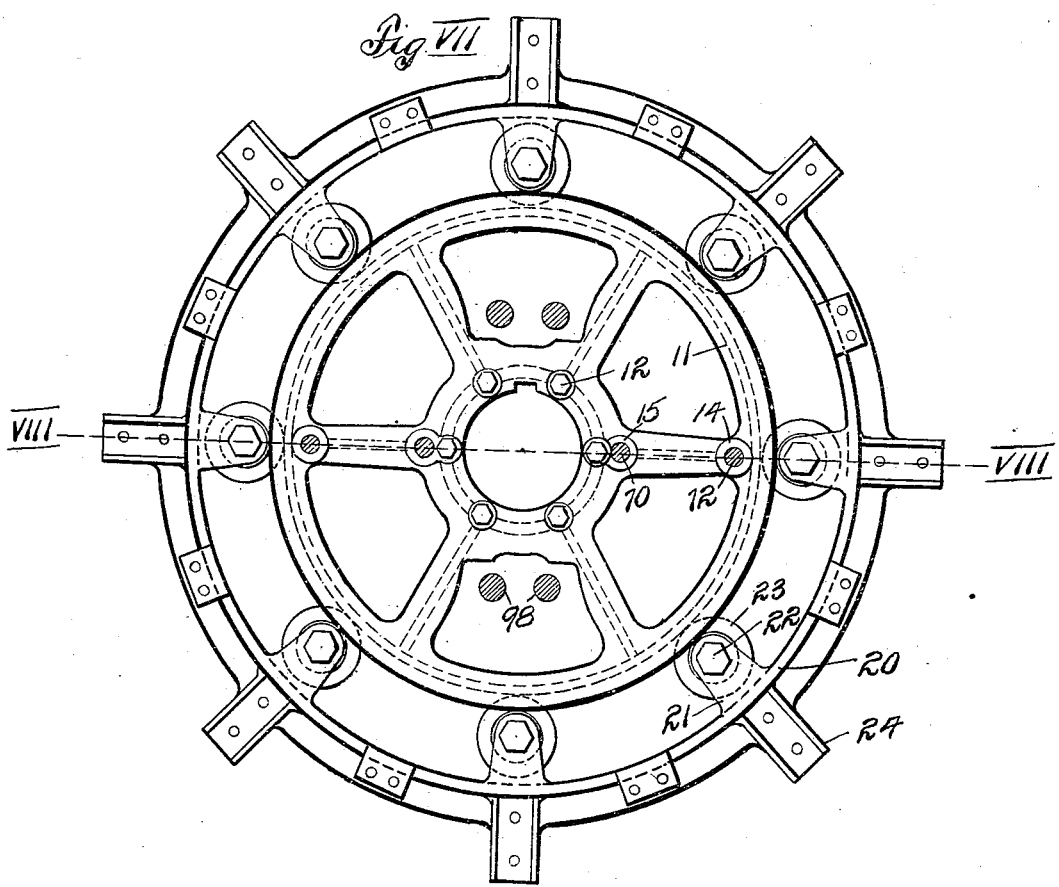
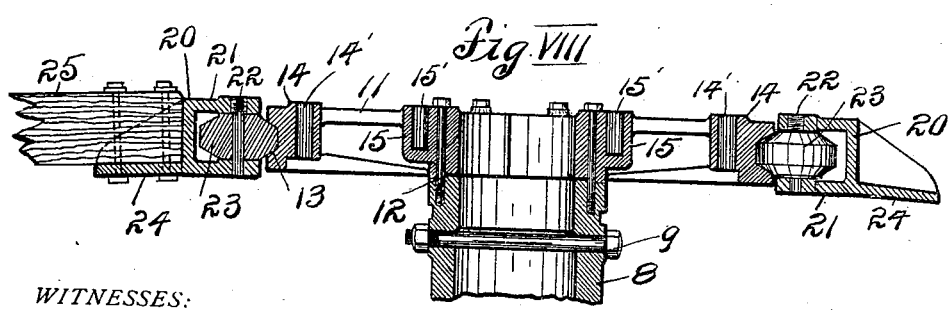

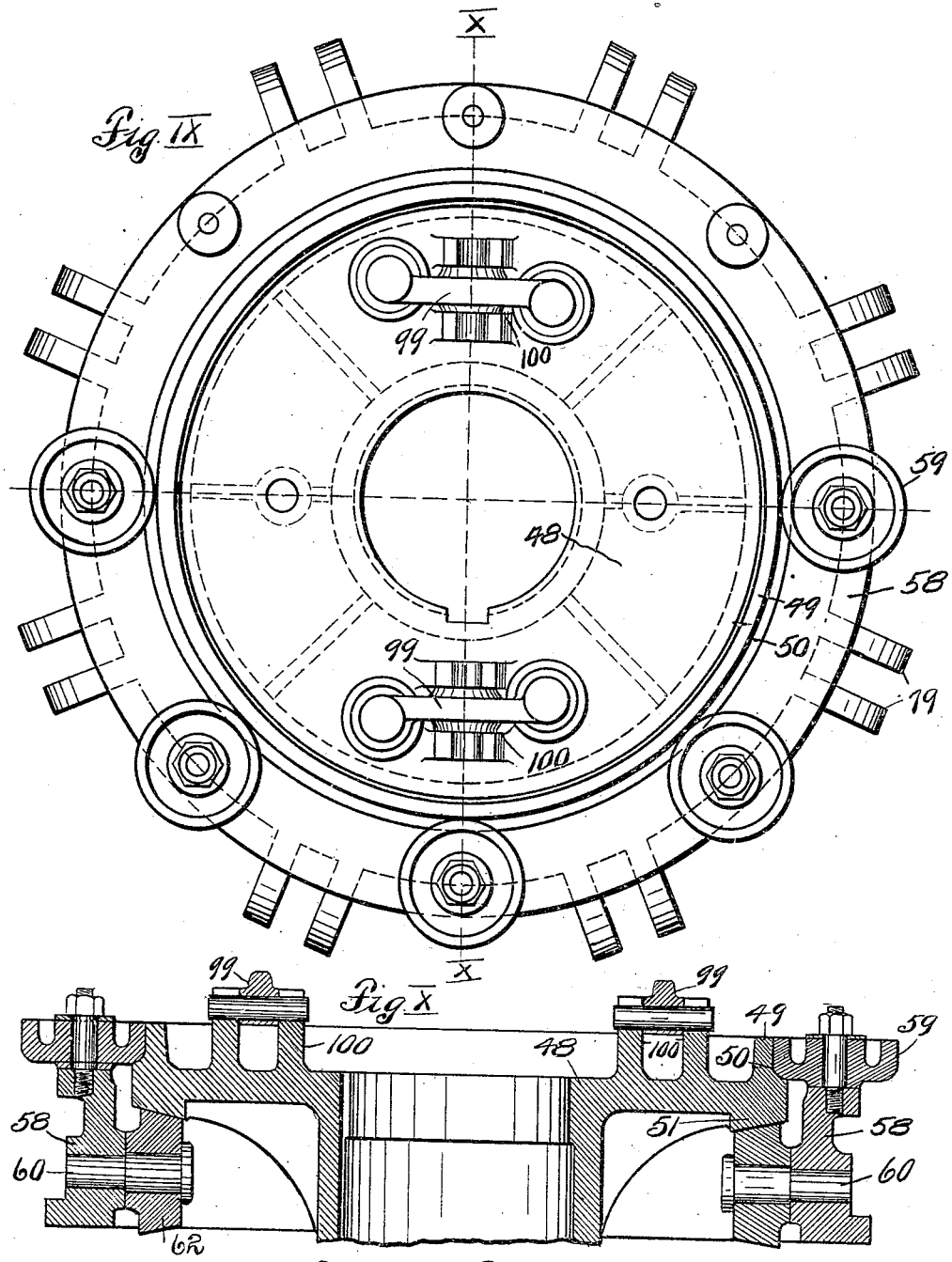

R. W. EASTON & E. T. WINKLER.
SWING.
APPLICATION FILED SEPT. 24, 1908.
951,061.
Patented Mar. 1, 1910.
9 SHEETS—SHEET 7.
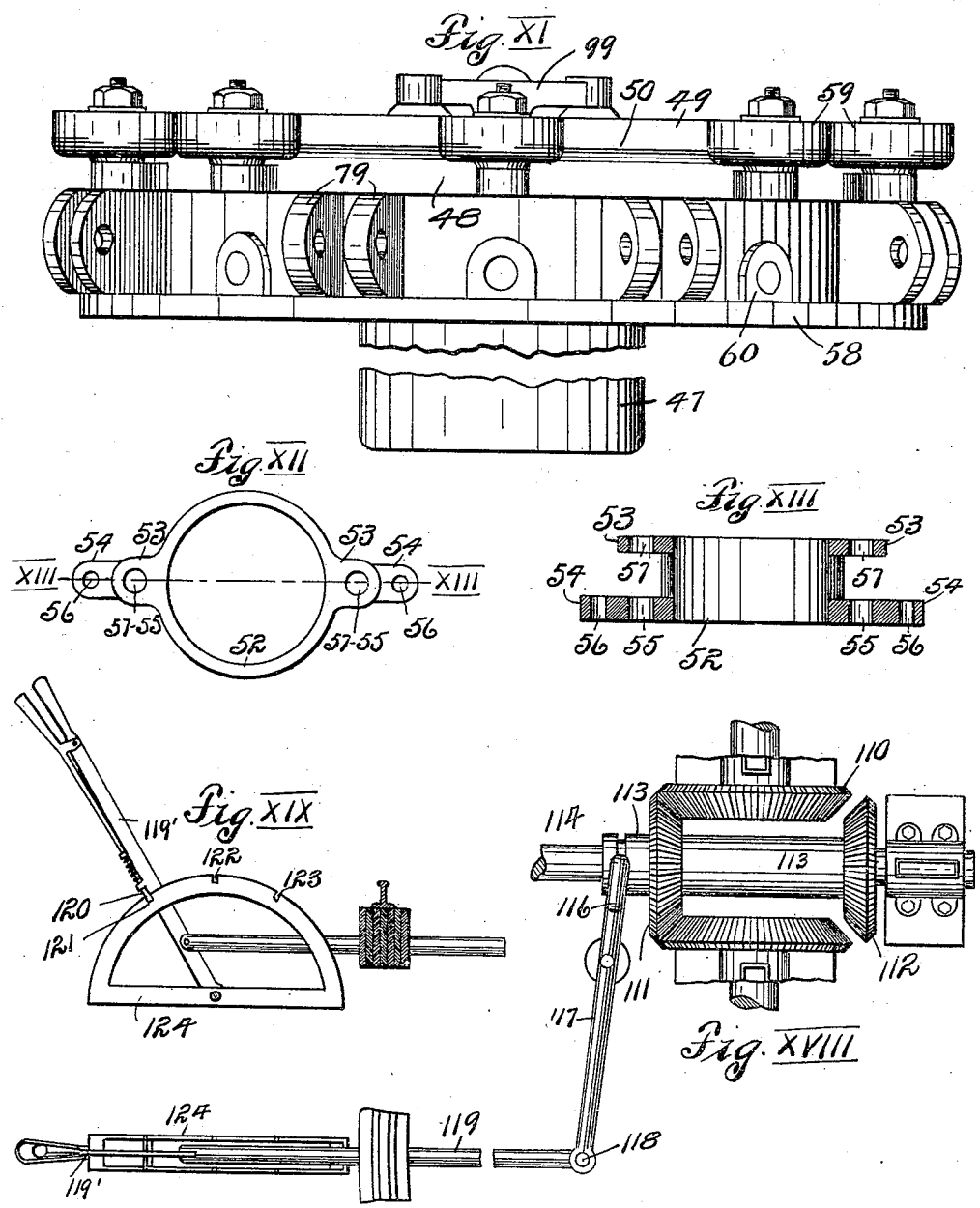
WITNESSES:
Myrtle M. Jackson
Charles R Mathews
INVENTORS
R. W. Easton & E. T. Winkler
BY
Arthur L. Brown
ATTORNEY.

R. W. EASTON & E. T. WINKLER.
SWING.
APPLICATION FILED SEPT. 24, 1908.
951,061.
Patented Mar. 1, 1910.
9 SHEETS—SHEET 8.
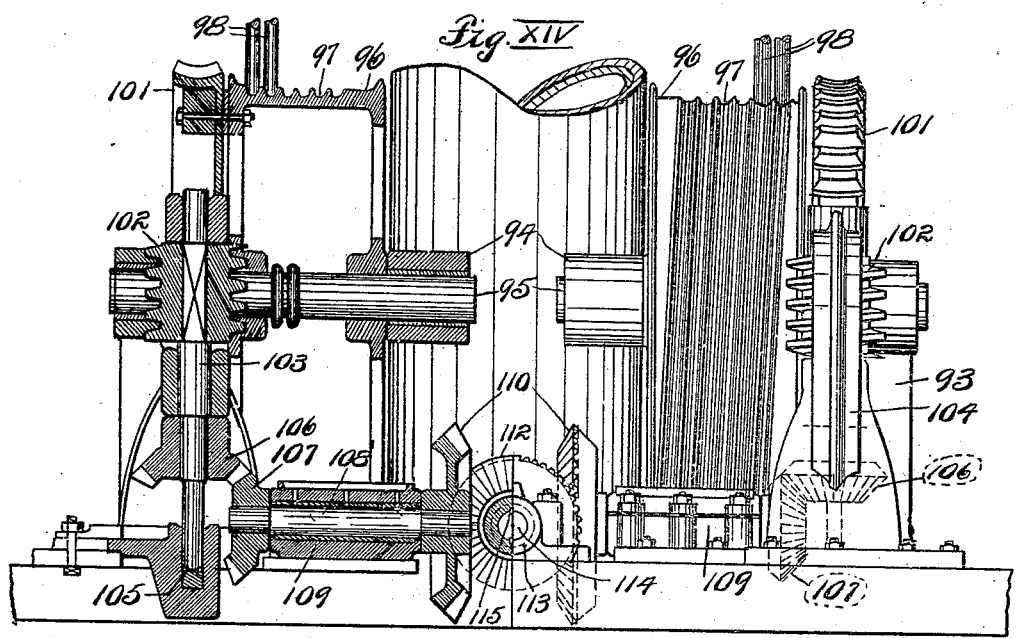
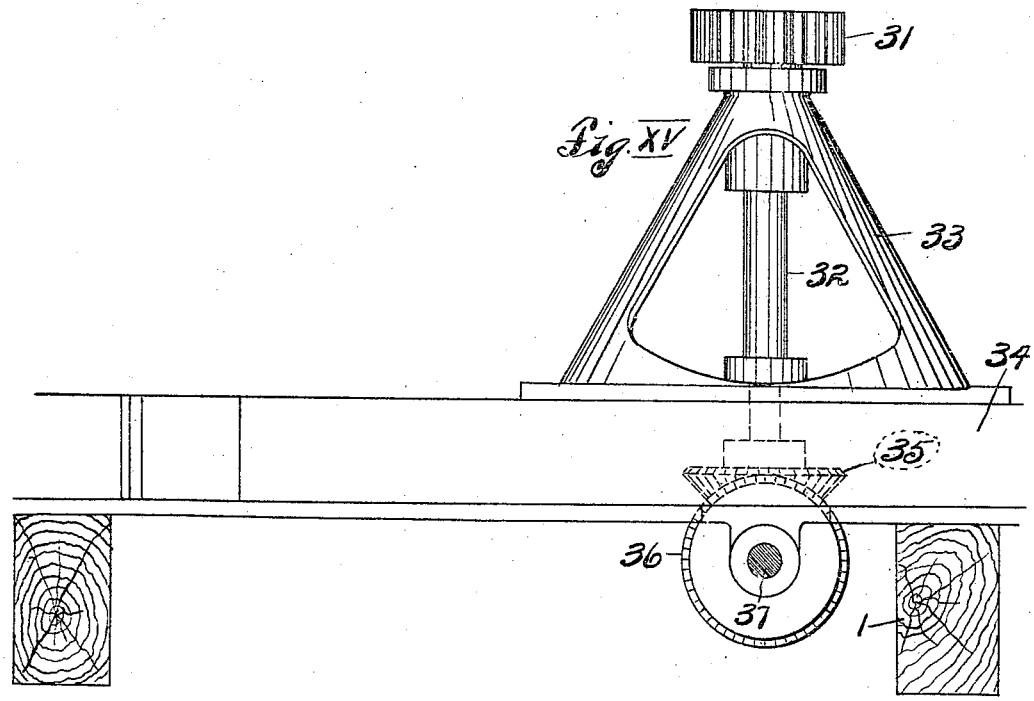
WITNESSES:
Myrtle M. Jackson
Charles Macateur
INVENTORS
R. W. Easton + E. T. Winkler,
BY
Arthur S. Brown
ATTORNEY.

R. W. EASTON & E. T. WINKLER.
SWING.
APPLICATION FILED SEPT. 24, 1908.
951,061.
Patented Mar. 1, 1910.
9 SHEETS—SHEET 9.
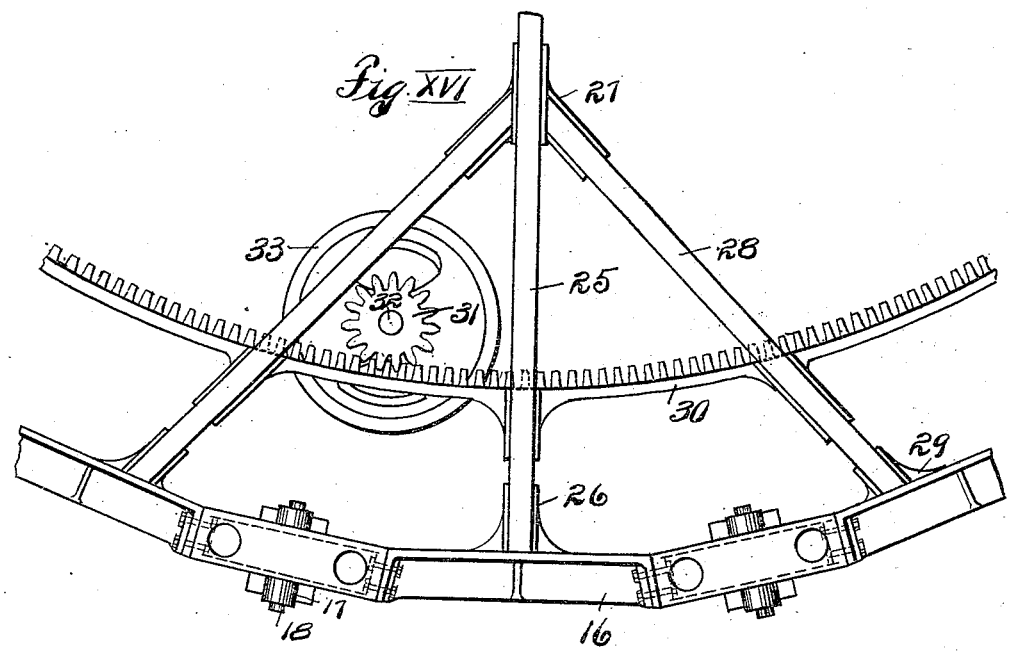
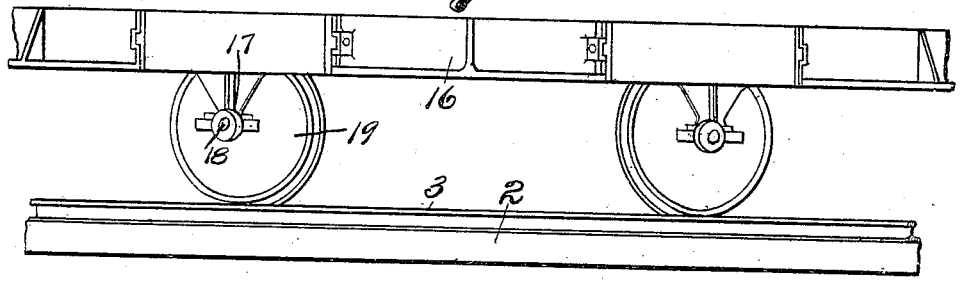
WITNESSES:
Myrtle M. Jackson.
Charles R Mathews
INVENTORS
R W Easton + E T Winkler
BY
Arthur C Brown
ATTORNEY.

UNITED STATES PATENT OFFICE.

RUFUS W. EASTON AND EHREGOTT T. WINKLER, OF KANSAS CITY, MISSOURI.

SWING.

951,061.  Specification of Letters Patent.  Patented Mar. 1, 1910.

Application filed September 24, 1908. Serial No. 454,601.

*To all whom it may concern:*

Be it known that we, RUFUS W. EASTON and EHREGOTT T. WINKLER, citizens of the United States, residing at Kansas City, in the county of Jackson and State of Missouri, have invented certain new and useful Improvements in Swings; and we do declare the following to be a full, clear, and exact description of the invention, such as will enable others skilled in the art to which it appertains to make and use the same, reference being had to the accompanying drawings, and to the numerals of reference marked thereon, which form a part of this specification.

Our invention relates to improvements in revolving swings, more particularly to improvements in that class of swings in which a number of cars are swung from and revolved around a central shaft.

It is the principal object of our invention to provide a swing of that class in which the weight of the cars and their parts is so carried that the bracing and supporting parts will not bind against the center shaft should the cars be unevenly loaded, and in which the strain on the central shaft is reduced to a minimum.

A further object is to provide the improved details of structure which will presently be fully described and pointed out in the claims, reference being had to the accompanying drawings, in which: —

Figure I is a top plan view of a swing constructed according to our invention. Fig. II is a view of same in side elevation partly in section, a number of the cars and their supporting parts being omitted, for better illustration. Fig. III is a plan view of the swing foundation. Fig. IV is an enlarged detail view of the upper and lower shaft collars, partly in section. Fig. V is an enlarged plan view of the lower shaft collar, taken on the line V—V, Fig. IV. Fig. VI is a similar view of the upper collar, taken on the line VI—VI, Fig. IV. Fig. VII is an enlarged plan view of the base collar, on the line VII—VII, Fig. IV. Fig. VIII is an enlarged view, in central vertical section of the same along the line VIII—VIII, Fig. VII. Fig. IX is an enlarged plan view of the upper shaft collar along the line IX—IX, Fig. IV. Fig. X is a cross section of the same, on the line X—X, Fig. IX. Fig. XI is a side view of the same. Fig. XII is an enlarged plan view of the gear wheel flange on the upper collar. Fig. XIII is a vertical sectional view of same on the line XIII—XIII, Fig. XII. Fig. XIV is an enlarged view, in elevation, of the cable drums and operative parts, one of the drums being in central vertical section, for better illustration. Fig. XV is an enlarged detail view of the swing revolving capstan. Fig. XVI is a top plan view of the swing revolving capstan and rack. Fig. XVII is a view, in elevation of a portion of the track and swing truck. Fig. XVIII is an enlarged plan view of the reversing mechanism with shipper. Fig. XIX is a side view of lever operating the shifting rod.

Referring more in detail to the parts:—
1 (Fig. III) designates a foundation, comprising in part, a circular sill 2, upon which is mounted a rail 3. At the center of the foundation is a base 4, having radial beams 5 which extend outwardly to sill 2 and are provided with angle beams 6 for firmly bracing the sill to maintain a rigid support for the swing superstructure. Seated on base 4 is a shaft 7, around which the swing parts revolve. Also seated on base 4 is a sleeve 8, which surrounds shaft 7 and is rigidly secured thereto by means of a bolt 9, and a spline 10, which latter extends upwardly on said shaft, and serves as an anchor to prevent revolution of the upper collar parts, and as a guide thereto, when they are raised and lowered on the shaft, as will presently be described.

Seated on, and rigidly secured to sleeve 8, by bolts 12 (Fig. VIII), is a circular flange 11, having a groove 13 around its periphery, and provided with the diametrically opposed rim lugs 14; having perforations 14', and the hub lugs 15, having sockets 15'.

16 (Figs. XVI and XVII) designates a circular truck beam, having depending axle bearings 17, in which are mounted the axles 18, and carried by said axles are the flanged wheels 19 which are adapted to travel on rail 3 and support the truck beam and superimposed parts.

Surrounding flange 11 is a ring 20 having inwardly directed yokes 21, provided with axles 22, and revolubly mounted on said axles are the guide rollers 23, which travel within the groove 13 in flange 11; the combination of the flange and the ring parts being such that the rollers are supported by the flange but adapted for substantially free revolution within the flange groove.

On the periphery of ring 20 are sockets 24, within which are secured the inner ends of the stringers 25, the outer ends of which are seated in the sockets 26 on the inner face of the truck beam 16.

27 designates socket brackets on stringers 25, and 28 angling beams seated in said brackets and in brackets 29 on the truck beam 16.

Rigidly secured to the under sides of the stringers 25 and beams 28 is a circular rack bar 30, the teeth of which project inwardly and are adapted for engagement with a toothed wheel 31, carried on a perpendicular shaft 32 which is revolubly mounted in a capstan frame 33 supported on and anchored to a base 34 integral with the swing foundation.

On shaft 32 (Fig. XV) is a beveled gear wheel 35, which meshes with a beveled gear 36 rigidly mounted on a shaft 37, which is journaled on beams in the swing foundation. On shaft 37 is rigidly mounted a sprocket wheel 38, and 39 designates a chain belt adapted to travel over wheel 38 and a sprocket wheel 40 which is rigidly mounted on the shaft 41 of an engine 42.

On the main shaft 7, above the base collar, is a sleeve 47 (Figs. X and XII), adapted for sliding movement on the shaft but held against revolution thereon by the spline 10. Sleeve 47 is provided with a circular top plate 48 having a flange 49 slightly inset from its periphery to form a roller seat 50, and having a beveled flange 51 depending from its outer edge. Rigidly secured to sleeve 47 is a collar 52, having the diametrically opposed upper and lower arms 53—54, each of the latter having an inner perforation 55 and an outer perforation 56, and each of the former having a perforation 57 registering with the inner perforation 55 in the lower arm member. Surrounding the sleeve members is a ring 58 on the top of which are axially mounted a number of horizontal rollers 59 adapted to revolve in the seat 50 of the top plate of collar 47 and impinge against flange 49. Projecting inwardly from ring 58 are a number of horizontal stub axles 60, upon which are revolubly mounted the rollers 62, having beveled peripheries adapted for engagement with the flange 51 on plate 48. Rigidly secured to and depending from ring 58 is a rack flange 63 (Fig. IV), having an internal gear 64 to engage the idler pinions 65 which are revolubly mounted on the bolt shafts 66 secured in the perforations 56 in the lower arms 54 of collar 52. Rigidly secured to shaft 7, near the top, is a collar 67, having diametrically opposed lateral arms 68, provided with the end bearings 69. Revolubly mounted in bearings 69 and in sockets 15′ in the flange 11 of the base collar seat, are the transmission rods 70, which project through perforations in the arms 71′ of a flange 71 secured to shaft 7 immediately above the base of the collar 52 and perforations in the top plate 48 of the upper collar set.

Revolubly mounted on perpendicular axles 72 projecting through the perforations in and rigidly secured to the rim lugs 14 on flange 11 (Fig. VII), are the idler gear wheels 73 which mesh with the teeth 74 of an internal gear 21′ on ring 21, and with the pinions 75 rigidly mounted on the transmission rods 70.

Projecting from the periphery of ring 58 are the yokes 79 within which are pivotally mounted the lower ends of the links 80 (Fig. II), the upper ends of which are pivotally mounted on the inner ends of the balancing rods 81. Rigidly secured to each of rods 81, near its center, is a clamp 82 having a depending yoke 83, within which is pivotally mounted the bracket plate 84; said plate being provided with the sockets 85 within which are secured the upper ends of the standards 86, two of which are supported on the truck beam 16, and the third extended inwardly to a seat on one of the stringers 25. At the end of each of the rods 81 is pivoted a yoke bracket 87 within the depending arms of which is axially mounted a sheave 88, and projecting through the yoke on each of said rods and supported by said sheaves is a continuous cable 89.

90 designates cars, adapted for carrying a number of passengers and having the top brackets 91 provided with the sheaves 92 which fit over and ride on the cable 89; there being preferably one car suspended between each of the balancing arms.

Revolubly mounted in standards 93 (Fig. XIV) and boxes 94, the latter being preferably integral with sleeve 8, are the shafts 95. Rigid on each of shafts 95 is a drum 96, having peripheral cable grooves 97, and anchored to each of said drums is a pair of cables 98, which extend upwardly through the non-revoluble portions of the upper and lower collar seats and have their upper ends secured to the opposite ends of a balancing lever 99 (Fig. IX), fulcrumed on a bracket 100 on the top plate 48 of the upper collar seat. Also rigid on each of shafts 95 is a toothed wheel 101, which is adapted to mesh with the worm 102 of a perpendicular shaft 103 journaled in a standard 104 and revoluble at its base in a socket 105 in the swing foundation.

On each of shafts 103 is a beveled gear wheel 106 adapted to mesh with a similar wheel 107 on a horizontal shaft 108 journaled in a bearing 109; each of said shafts being provided at its inner end with a bevel gear wheel 110, both of which wheels 110 are adapted to mesh with a gear wheel 111, or with a gear wheel 112, on a sleeve 113 carried by a shaft 114 which extends outwardly to a point adjacent to engine 42; and is connected with the engine shaft 41 by the sprockets 41'—114' and belt 125; said collar being adapted for longitudinal sliding movement on said shaft to bring either wheel 111 or wheel 112 into mesh with wheels 110 or both wheels to a neutral position in which neither of the gears on said sleeve is in mesh with said wheels 110; 115 designates splines on shaft 114 which are adapted to engage sleeve 113 for the purpose of revolving said sleeve when said shaft is revolved.

The sleeve 113 is actuated by means of a shipper 116—117 (Fig. XVIII), which is fulcrumed at 118 and has an operating rod 119 extending to a point adjacent to engine 42, where it is provided with a lever handle 119' having a spring pawl 120 which is adapted to fit within one of three notches 121, 122, 123, in a quadrant 124.

When in use the parts are assembled as described, and when ready for operation the cars are in their lowered position for receiving passengers. When the cars are loaded, the engine is started in operation and the sleeve on the shaft operating the elevating drums moved to bring gear wheel 111 into mesh with the gears 110. The elevating drums are then revolved through the worm gear and the cables wound thereon, drawing the upper collar set down on the central shaft, so that the inner ends of the balancing rods are lowered and their outer ends correspondingly raised to elevate the cars, which are suspended from the cable 89 by such outer rod ends. When the cars have been raised to the desired height, the sleeve 113 is moved to bring the wheels 111—112 to their neutral position when the gears on the sleeve will be free from engagement with the gears on shaft 108, and the cars held in their elevated position by the binding of the drum gears on the worm shafts. At the same time the shaft 37, which is connected with the engine shaft, is revolved and the gear wheel 31 on the capstan revolved; such wheel meshing with the rack on the truck stringers and causing a revolution of the truck frame, the rollers on the inner ends of stringers 25 traveling in the groove in the base collar flange 11, and the ring 58 revolving around the upper collar sleeve 47, with the ring rollers 59 and 62 in engagement with the flanges on the non-revoluble sleeve on the top plate 48.

While the revolution of the swing may be accomplished by the parts just described alone, we provide an auxiliary revolving mechanism for affording a direct drive to the balancing rods, which consists of the gearing carried and operated by the vertical guide rods. As ring 20 revolves around the lower flange 11, the rack teeth on its inner surface engage the teeth of the idler 73, which, in turn, engages the gear wheels 75 rigid on the guide rods, and revolve such rods. As the rods 70 are revolved, they carry with them the gear wheels 78 which are splined on the guide rods and travel vertically with the upper collar seat; such wheels 78 meshing with the idlers 65 which in turn mesh with the ring gear 63 and cause a revolution of the upper collar seat independent of the following action imparted thereto by the lower truck travel. As the speed of the swing increases, centrifugal force carries the cars outwardly at an increasing angle, but owing to the fact that they are all hung from the loose cable 89, they pull against each other instead of against the center shaft, thereby obviating the lateral strain on such shaft. The balancing rods 81 are supported by the standards 86, which in turn are supported on the truck frame instead of by the center shaft so that not only is such shaft relieved of the centrifugal pull but also of the vertical load of the car parts.

When it is desired to unload the cars, the engine is slowed down and as the cars begin to run slow enough the gear wheel 112 is brought into action by shifting sleeve 113 to bring the gear wheel into mesh with the gear wheels 110, so that the drums are revolved backwardly by the revolution of shaft 114 to bring said cars to their lowered position, such shaft having a constant connection with engine shaft and the change of direction of the drum travel being accomplished by shifting the sleeve, as stated.

Having thus described our invention, what we claim as new therein and desire to secure by Letters Patent is:—

1. A swing comprising a stationary base, a revoluble superstructure, standards on said superstructure, balancing rods fulcrumed on said standards, a continuous cable carried by said rods, cars provided with sheaves mounted on said cable, and means for lowering the inner ends of said rods, for the purpose set forth.

2. In a swing, the combination with a series of radial balancing rods and means for supporting same, of pulley blocks mounted on the outer ends of said rods, pulleys carried in said blocks, a continuous cable carried by said pulleys, brackets having pulleys adapted for travel on said cable between adjacent balancing rods, cars depending from said brackets, means for lowering the inner ends of said rods to elevate said cars, and means for revolving said rods.

3. In a swing, the combination of a suitable truck, a stationary center shaft, a collar slidably mounted on said shaft, a ring revolubly mounted on said collar, means on said truck for carrying balancing rods, balancing rods carried thereby and connected at their inner ends with said ring, rods revolubly mounted adjacent to said shaft and projecting through said collar, means for revolving said rods, and gearing connecting said rods and said ring, for the purpose set forth.

4. In a swing, the combination of a suitable truck, a stationary center shaft, a collar slidably mounted on said shaft but held against revolution thereon, a ring revolubly mounted on said collar, a rack on said ring facing said collar, means on said truck for carrying balancing rods, balancing rods carried thereby and connected at their inner ends with said ring, guide rods revolubly mounted adjacent to said center shaft and projecting through said collar, idlers on said collar engaging the ring rack, gear wheels on said guide rods engaging said idlers, means for actuating said guide rods, and cars carried by the outer ends of said balancing rods.

5. In a swing, the combination with a suitable truck, of a center shaft, a collar rigid on said shaft, a flange surrounding and adapted for revolution around said collar, stringers connecting said truck and said flange, an upper collar slidably mounted on said shaft but keyed against revolution thereon, a ring surrounding and adapted for revolution around said collar, means on said truck and said stringers for supporting balancing rods, balancing rods carried by said means, cars carried by the outer ends of said rods, links connecting the inner ends of said rods with said ring, cables connected with said upper collar, means for actuating said cables to lower said upper collar, and means for revolving said truck, for the purpose set forth.

6. In a swing, the combination with a revoluble truck, of a center shaft, a collar slidably mounted on said shaft, a ring adapted for revolution around said collar, balancing rods carried on said truck and connected at their inner ends to said ring, cars suspended from the outer ends of said rods, standards adjacent to the shaft base, drum shafts revoluble in said standards, drums rigid on said shafts, rocking levers on said collar, cables connected with said levers and attached to said drums, gear wheels on said drum shafts, worms engaging said gear wheels, means for operating said worms, and means for revolving said truck, for the purpose set forth.

In testimony whereof we affix our signatures in presence of two witnesses.

RUFUS W. EASTON.
EHREGOTT T. WINKLER.

Witnesses:
MYRTLE M. JACKSON,
E. A. CAHILL.